US011524186B2

(12) United States Patent
Musgrove

(10) Patent No.: US 11,524,186 B2
(45) Date of Patent: Dec. 13, 2022

(54) LOW-FLOW ALARM AND VALVE

(71) Applicant: Ansell Limited, Richmond (AU)

(72) Inventor: Christopher Alan Musgrove, Redhill (GB)

(73) Assignee: Ansell Limited, Victoria (AU)

( * ) Notice: Subject to any disclaimer, the term of this patent is extended or adjusted under 35 U.S.C. 154(b) by 894 days.

(21) Appl. No.: 16/347,317

(22) PCT Filed: Oct. 18, 2017

(86) PCT No.: PCT/AU2017/000222
§ 371 (c)(1),
(2) Date: May 3, 2019

(87) PCT Pub. No.: WO2018/081847
PCT Pub. Date: May 11, 2018

(65) Prior Publication Data
US 2019/0255368 A1   Aug. 22, 2019

Related U.S. Application Data

(60) Provisional application No. 62/417,424, filed on Nov. 4, 2016.

(51) Int. Cl.
| A62B 9/00 | (2006.01) |
| A62B 9/02 | (2006.01) |
| A62B 23/02 | (2006.01) |
| F16K 37/00 | (2006.01) |
| A62B 17/00 | (2006.01) |

(52) U.S. Cl.
CPC ........... *A62B 9/006* (2013.01); *A62B 9/02* (2013.01); *A62B 17/006* (2013.01); *A62B 23/02* (2013.01); *F16K 37/0066* (2013.01)

(58) Field of Classification Search
CPC ........ A62B 9/02; A62B 9/006; A61M 16/206; A61M 16/207; A61M 16/208; A61M 16/209
See application file for complete search history.

(56) References Cited

U.S. PATENT DOCUMENTS 2,709,983 A * 6/1955 Divietro ............. B60C 23/0496
116/34 R
3,244,196 A * 4/1966 Replogle ................ A62B 9/006
137/557

(Continued)

FOREIGN PATENT DOCUMENTS

| EP | 1093830 A1 | 4/2001 |
| EP | 1363052 B1 | 8/2005 |
| GB | 644105 A | 10/1950 |
| GB | 2511363 * | 3/2014 ............. A62B 18/08 |

(Continued)

OTHER PUBLICATIONS

Extended European search report for Application No. 17868355.3 dated Jun. 15, 2020, 9 pgs.

(Continued)

*Primary Examiner* — Michael J Tsai
(74) *Attorney, Agent, or Firm* — Moser Taboada

(57) ABSTRACT

A low-flow alarm optionally having a variable pressure pre-set threshold, for use with protective suits and hoods is disclosed. In one embodiment, a low-flow valve alarm comprises an adjustable spindle handwheel having a hole, a valve body having an air inlet port, the valve body connected with the adjustable spindle handwheel, a hollow handwheel body joined to the adjustable spindle handwheel, a diaphragm sealing collar joined to a whistlehead retaining body, the whistlehead retaining body having a central bore and joined with a whistlehead, a resilient diaphragm joined with a control spindle disposed within the central bore of the whistlehead retaining body, the control spindle having an air channel, wherein air can travel through the air channel, wherein air flow is adapted to act on the resilient diaphragm, compressing a spring and wherein a low air pressure condition relaxes compression on the spring, producing an audible alarm.

20 Claims, 4 Drawing Sheets

(56) References Cited

U.S. PATENT DOCUMENTS

| | | | | |
|---|---|---|---|---|
| 3,611,981 A | * | 10/1971 | Warncke | G01L 19/08 |
| | | | | 137/557 |
| 3,785,333 A | * | 1/1974 | Warncke | A61M 16/0051 |
| | | | | 137/557 |
| 3,807,445 A | * | 4/1974 | McPhee | F16K 37/00 |
| | | | | 137/557 |
| 3,811,400 A | * | 5/1974 | Smilg | G01L 19/08 |
| | | | | 137/557 |
| 3,910,222 A | * | 10/1975 | Metivier | A61M 16/0051 |
| | | | | 137/557 |
| 4,249,473 A | * | 2/1981 | Pasternack | A62B 9/006 |
| | | | | 116/276 |
| 4,250,876 A | | 2/1981 | Kranz | |
| 4,669,415 A | | 6/1987 | Boord | |
| 6,209,579 B1 | * | 4/2001 | Bowden | F17C 13/025 |
| | | | | 137/557 |
| 2015/0202404 A1 | | 7/2015 | Patriksson et al. | |

FOREIGN PATENT DOCUMENTS

| WO | WO-9913945 A1 * | 3/1999 | A62B 9/006 |
|---|---|---|---|
| WO | WO-2014132059 A2 | 9/2014 | |

OTHER PUBLICATIONS

International Search Report for PCT Application No. PCT/AU2017/000222 dated Jan. 31, 2018.

* cited by examiner

LOW-FLOW ALARM AND VALVE

BACKGROUND

Field

Embodiments of the present invention generally relate to personal protective equipment and, particularly, to a low-flow valve alarm for use in conjunction with protective suits and hoods.

Description of the Related Art

Protective suits, such as HAZMAT suits, splash suits, tactical suits for law enforcement, gas tight suits, and other encapsulating suits and/or hoods are used in many environments and must protect wearers against chemical and/or gaseous/noxious hazards and/or nuclear particles. Protective suits and hoods protect not only the wearer but also provide air for breathing and ventilation via air lines, such as self-contained breathing apparatus. However, air within the air tanks used as part of self-contained breathing apparatus may become emptied and/or lose adequate air pressure during use, which can be hazardous to the user. Furthermore, the use of electronic or electric alarms for indicating a loss of air pressure is not always safe in a flammable gas environment. Also, different environments may require different air pressures in a respective suit or hood, so providing a variable pressure within suits and/or hoods is desirable.

Therefore, a low-flow valve alarm having an audible low air pressure alarm and/or continuous flow valve represents an advance in the art.

SUMMARY

Embodiments of the disclosure comprise a low-flow valve alarm, substantially as shown in and/or described in connection with at least one of the figures, as set forth more completely in the claims. Various advantages, aspects and novel features of the present disclosure, as well as details of an illustrated embodiment(s) thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments and are therefore not to be considered limiting of its scope of embodiments of the invention, for the embodiments may suggest other equally effective embodiments within its scope.

While several embodiments and illustrative drawings are described herein, those skilled in the art will recognize that the embodiments are not limited to the embodiments of drawing or drawings described. It should be understood that the drawings and detailed description thereto are not intended to limit the invention to the particular form disclosed, but on the contrary, contemplates all modifications, equivalents and alternatives falling within the spirit and scope of the present disclosure. The headings used herein are for organizational purposes only and are not meant to be used to limit the scope of the description or the claims. As used throughout this application, the word "may" is used in a permissive sense, i.e., meaning having the potential to, rather than the mandatory sense, i.e., meaning must. Similarly, the words "include," "including," and "includes" mean including, but not limited to.

DETAILED DESCRIPTION

Embodiments of the disclosure comprise a low-flow valve alarm device. Embodiments of the low-flow valve alarm device can be used with protective suits and hoods having an air supply delivered to the suit via a pressurized airline connection. The pressurized air goes into a low-flow valve alarm that controls/regulates the air flow into the hood/suit so that the pressure is not too low or high for a given environment. For added safety, the low-flow valve alarm may comprise an alarm, i.e., an audible signal, which sounds if the air flow is under the minimum pressure/flow requirement, which is optionally pre-set. Embodiments of the disclosure further comprise a low-flow valve alarm having a resilient diaphragm located inside the device wherein the resilient diaphragm partitions the device into a first chamber communicating with a first opening and a second chamber communicating with a second opening. The low-flow valve alarm, optionally, further comprises an adjustable stop. The low-flow valve alarm further comprises a spring located inside the device, configured to bias a position of the adjustable stop, based on a pressure differential between the first chamber and the second chamber. The spring, optionally, is disposed between the resilient diaphragm and a collar of s control spindle inside the device. A low pressure differential warning, e.g., an audible alarm, is associated with a position of the diaphragm. In at least one embodiment according to the disclosure, the low-flow valve alarm comprises a whistlehead in communication with the second chamber that sounds when the low-flow valve alarm undergoes a pressure differential that is less than a threshold. The threshold is optionally a variable, and/or pre-set threshold.

Figure 1:
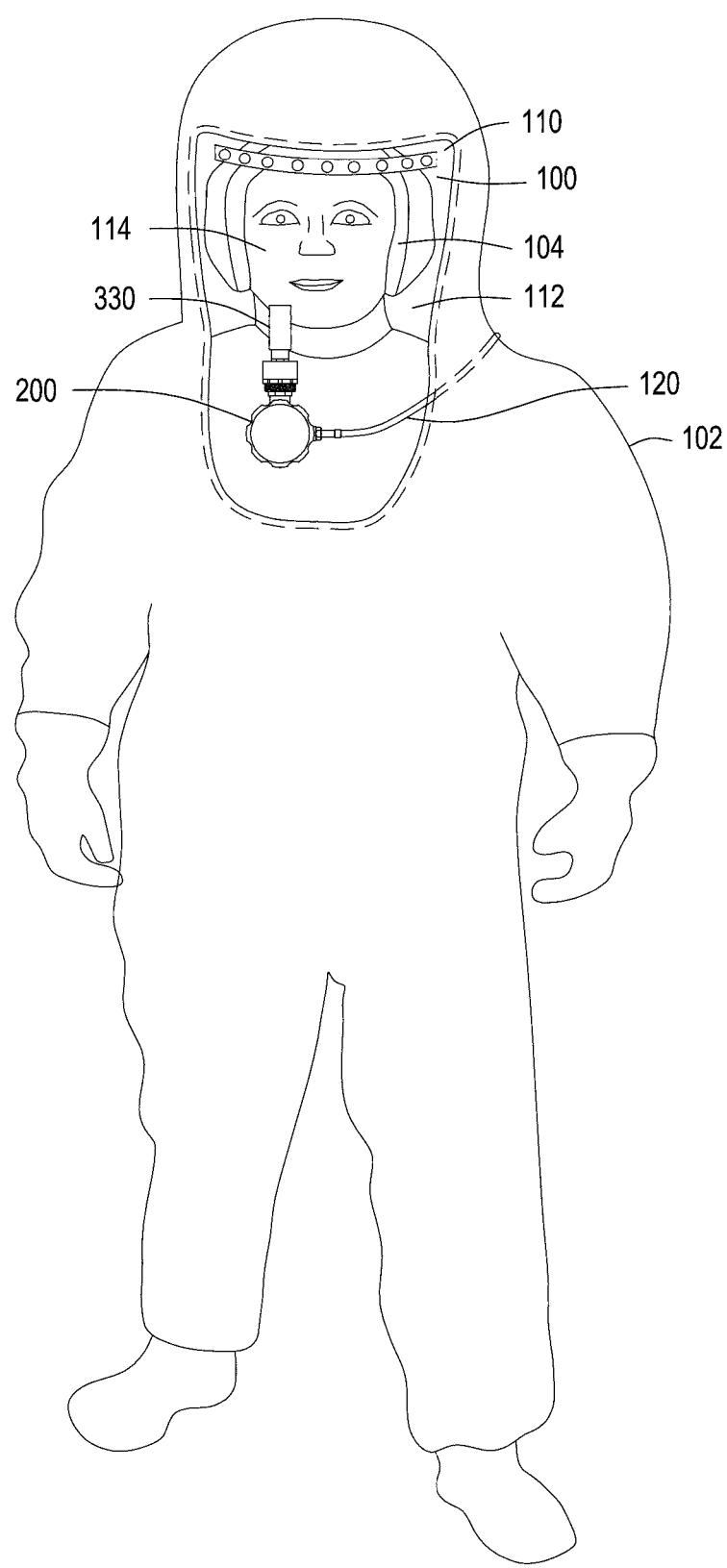
FIG. 1 shows personal protective equipment, comprising an exemplary low-flow valve alarm and a protective suit, according to embodiments of the disclosure.

Furthermore, the low-flow valve alarm may be configured to direct sound emanating therefrom away from the ears of a wearer or, alternatively, toward the ears of a wearer of a suit having the low pressure warning device. The low-flow valve alarm may be configured so that it is less likely to be covered, and therefore muted, by clothing. The low-flow valve alarm optionally further comprises an adjustable valve handwheel, permitting the same valve to operate on different air-line pressures. For example, the low-flow valve alarm operates between approximately 2 bar to approximately 10 bar of pressure. Embodiments of the disclosure further comprise a low-flow valve alarm having interchangeable parts, allowing differently sized valve handwheels for operating at different air pressures. Embodiments of the disclosure comprise differently sized valve handwheels having smaller FIG. 1 shows personal protective equipment 100, comprising an exemplary low-flow alarm valve 200, and a protective suit 102, according to embodiments of the disclosure. The personal protective equipment 100 further comprises wherein the low-flow alarm valve 200 is disposed inside a hood 112. The protective suit 102, optionally further comprises a visor 110 and is worn, for example, by a person 104, wearing a face mask 106 in the close proximity to the face of the person 104. The low-flow alarm valve 200 is connected with an air tank (not shown) by a conduit 120. The low-flow alarm valve 200, as shown, has a whistlehead 330, which is optionally pointed toward an ear 114 of the person 104.

Figure 2:
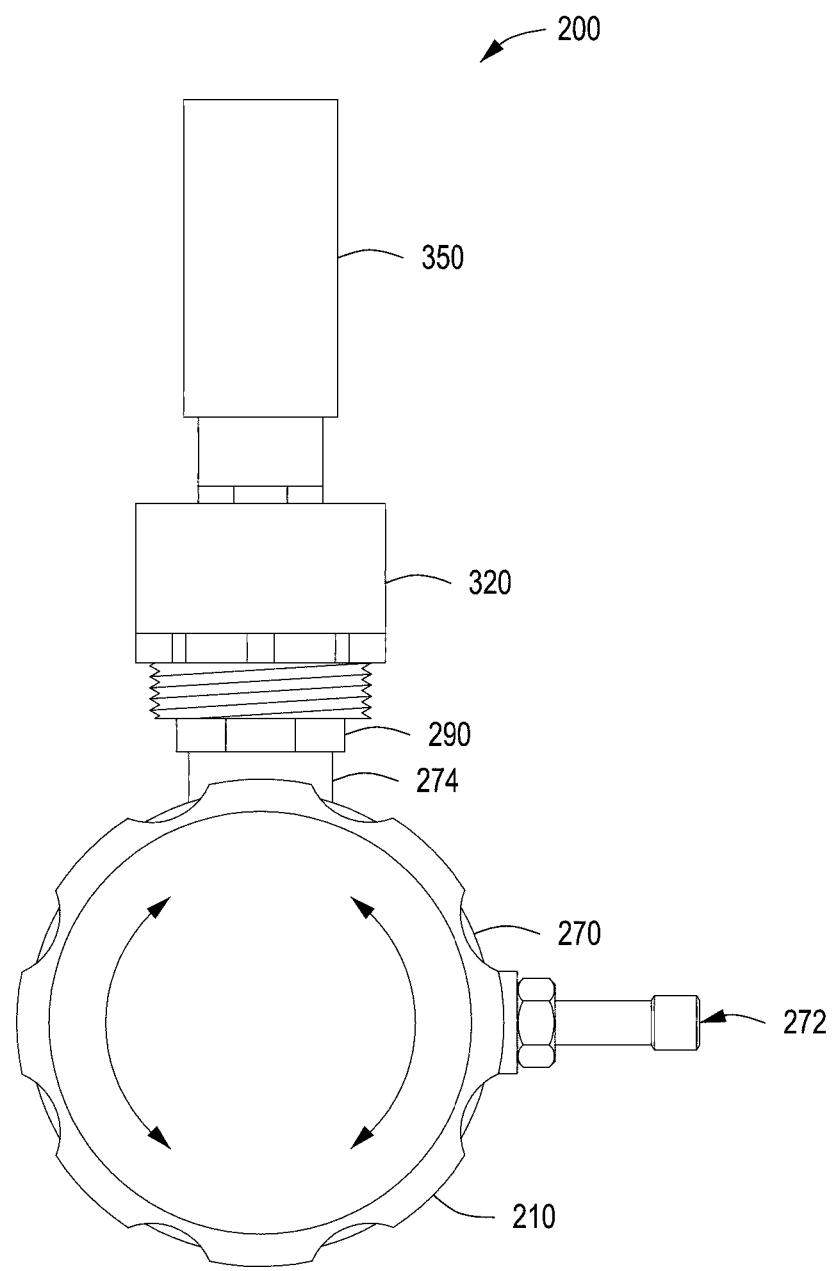
FIG. 2 depicts an assembled view of a low-flow valve alarm, according to embodiments of the disclosure.

FIG. 2 depicts an assembled view of a low-flow valve alarm 200, according to embodiments of the disclosure. As shown, the low-flow valve alarm 200 comprises a spindle handwheel 210, connected with a diaphragm sealing collar 290, which is connected with a valve body 270 having an air exhaust port 272. The air exhaust port 272, as shown, is joined to a whistlehead retaining body 320 and a whistlehead locking tube 350, which is optional, and serves to direct sound toward the ears of a user and, furthermore, protects the whistlehead (shown below) from being inadvertently covered. In at least one embodiment, the whistlehead locking tube 350 may comprise an angled configuration (not shown), so it may be further directed to other specific areas. The air exhaust port 272 is optionally coupled with a conduit, described above, that leads through the protective suit or hood and exhausting to the external environment.

Figure 3A:
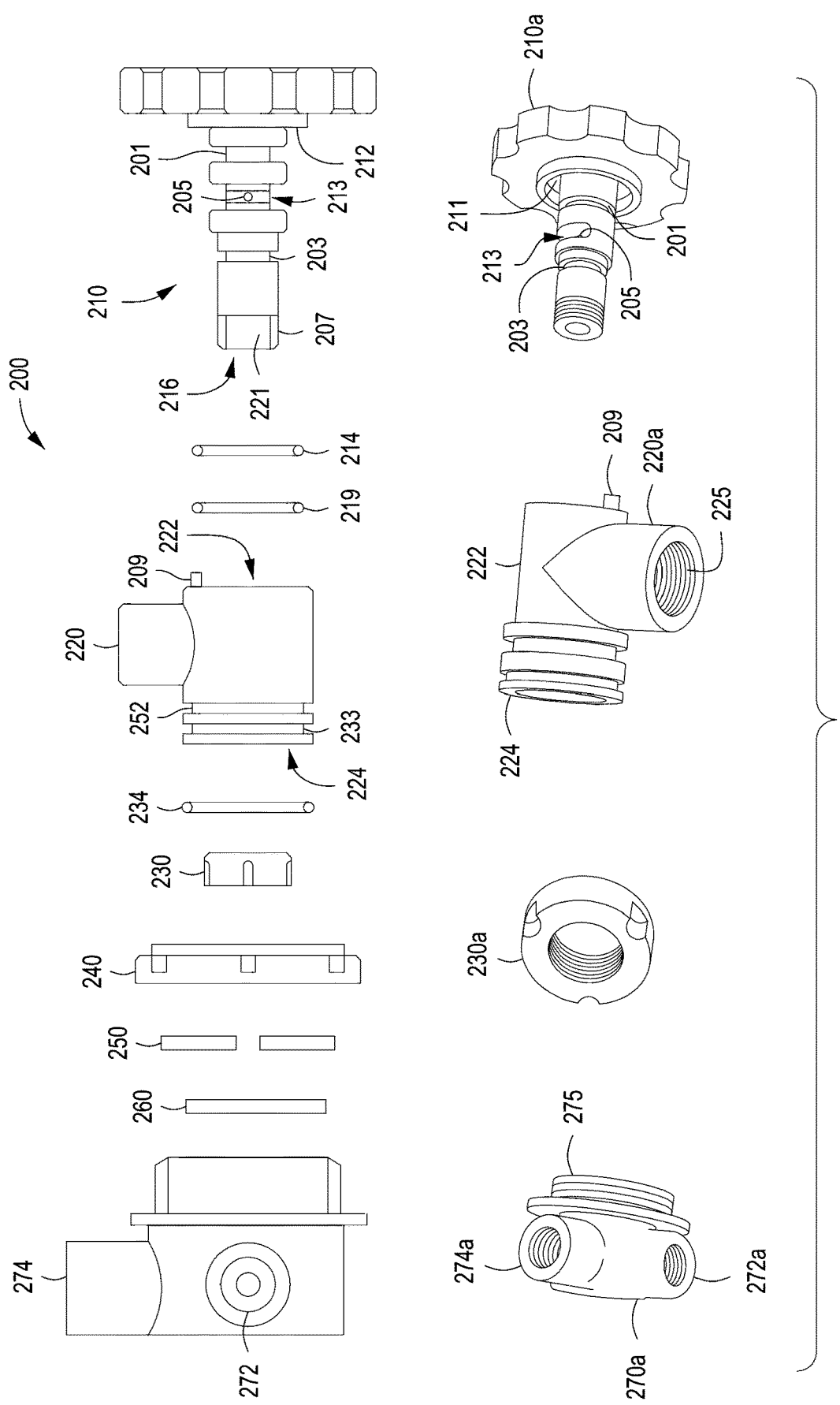
FIGS. 3A-3B show exploded side views of a low-flow valve alarm, according to embodiments of the disclosure.
Figure 3B:
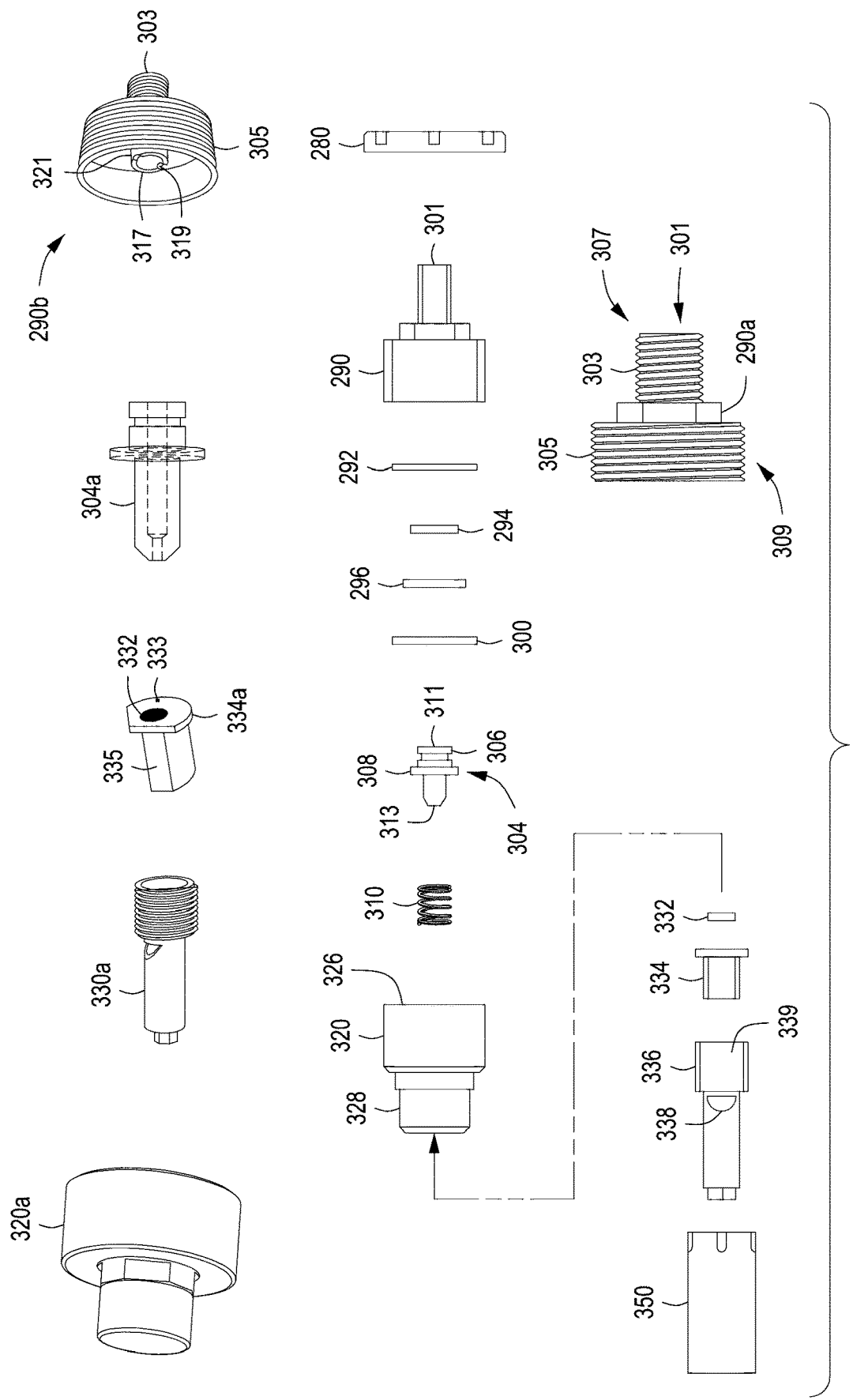

FIGS. 3A-3B show exploded side views of a low-flow valve alarm 200, according to embodiments of the disclosure. FIG. 3A shows an exploded side view of a spindle handwheel 210 (a perspective view is shown as 210a), a handwheel body 220 (a perspective view is shown as 220a) and a valve body 270 (a perspective view is shown as 270a) of the low-flow valve alarm 200, according to embodiments of the disclosure. The low-flow valve alarm 200 comprises a spindle handwheel 210, which joins to a hollow handwheel body 220, against a first flange 212 located on the spindle handwheel 210. In at least one embodiment according to the disclosure, the hollow handwheel body 220 comprises a threaded distal end 207, which traverses through an inner diameter of the spindle handwheel 210 and is releasably engaged via a press fit. Also, the hollow handwheel body 220 can be further joined by a retaining nut 230, which has an internal threaded surface for engaging the threaded distal end 207. A resilient gasket 214, such as an o-ring made of an elastomer, may be disposed within a groove 201 on the spindle handwheel 210. Similarly, a smaller resilient gasket 219 may be disposed on a smaller groove 203 of the spindle handwheel 210. As seen in perspective view 210a of the spindle handwheel 210, the first flange 212 comprises a channel 211 for receiving a post 209 on the hollow handwheel body 220, which controls the distance that the spindle handwheel 210 can travel. As shown, the channel 211 permits air to flow therethrough, wherein the spindle handwheel 210 rotates approximately 150° for adjusting airflow. The perspective view 210a shows that the spindle handwheel 210 further comprises air cavity 213 disposed between the resilient gasket 214 and the smaller resilient gasket 219, which is closer to distal end 216. The air cavity 213 further comprises hole 205, which is in fluid communication with a center bore 221 of the spindle handwheel 210. Air may be introduced into the low-flow valve alarm 200 via an air inlet port 225. The spindle handwheel 210, when in a relatively open position, means that the hole 205 is positioned directly adjacent to a port in the center bore 221, allowing air to flow freely therethrough. When in a relatively closed position, the hole 205 is positioned more distal to the port in the center bore, restricting, though not eliminating, the free flow of air because the air must travel through the air cavity 213 to reach the center bore 221. The difference in the flow of air results in the pressure that reaches the whistlehead (described below), audibly alerting the user to differing air pressures. A variety of different spindle handwheel 210 may be used. For example, the spindle handwheel 210 may comprise one of several different sizes of holes 205. In some embodiments, the diameter of the hole 205 is 2.2 mm. In some embodiments, the diameter of the hole 205 is 2.4 mm. In some embodiments, the diameter of the hole 205 is 5.5 mm. In some embodiments, the diameter of the hole 205 ranges from approximately 2.0 mm to approximately 6.0 mm. Similarly, the spindle handwheel 210 may comprise one or more of several different sizes of the air cavity 213, which may range from a depth of approximately 0.30 mm to approximately 0.80 mm and a width of 4.0 mm. In some embodiments, the air cavity 213 comprises a depth of approximately 0.55 mm to approximately 1.90 mm and a width of 4.0 mm. In some embodiments, the air cavity 213 comprises a depth of approximately 0.15 mm to approximately 1.05 mm and a width of 4.0 mm. In some embodiments, the air cavity 213 comprises a depth of approximately 1.60 mm to approximately 2.40 mm and a width of 5.5 mm.

The hollow handwheel body 220 further comprises a first opening 222 for receiving a distal end 216 of the spindle handwheel 210, which traverses through a second opening 224 of the hollow handwheel body 220. An o-ring 234 is optionally disposed between a connecting collar 240 and the hollow handwheel body 220 in handwheel body groove 233. The handwheel body 220 houses the connecting collar 240, which has internal threads for joining the handwheel body 220 to the external threads 275 of the valve body 270. In some embodiments of the disclosure, the retaining collar 240 mates with two semi-circular retaining collars 250, which fit within a retaining collar groove 252. The valve body 270 has a hollow bore into which a filter disc 260 is disposed. The valve body 270 further comprises an air exhaust port 272 (a perspective view is shown as 270a) for exhausting air from, for example, a pressurized air source, e.g., an air cylinder as is known to those in the art and an exit port 274 (a perspective view is shown as 274a), to which the whistlehead, shown below, is joined. The filter disc 260 is a porous, polymeric non-woven or fibrous material, such as, but not limited to, a foamed polyethylene, polypropylene, e-polytetrafluoroethylene, polyethersulphone, or nylon membrane or other membrane. Also, the filter disc 260 filters particles from the air flow. If the filter disc 260 becomes clogged with dirt or other particles, the air pressure drops and the audible alarm will sound. The filter disc 250 may be replaceable.

FIG. 3B shows an exploded side view of a diaphragm sealing collar 290 (a perspective view is shown as 290a), a diaphragm 300, a control spindle 304 (a perspective view is shown as 304a), a whistlehead retaining body 320 (a perspective view is shown as 320a), and a whistlehead 330 of the low-flow valve alarm 200, in accordance with embodiments of the disclosure. A locking ring 280, having internal threads, tightens a diaphragm sealing collar 290 (which has external threads 303 on a first side shaft 307 and external threads 305 on a second side shaft 309 opposite the first side shaft 307), which has a center bore, with the valve body 270 (as shown in FIG. 3A). The position of the locking ring 280 can be used to adjust the position of the whistlehead retaining body 320, which is screwed onto the distal end 309 of the diaphragm sealing collar 290.

The diaphragm sealing collar 290 having a bore 301, an optional slip washer 292, a circular clip 294, a diaphragm sealing washer 296, a resilient diaphragm 300, a control spindle 304 and a spring 310 are disposed within a proximal end 326 of the whistlehead retaining body 320, which is hollow and comprises a bore (not shown). Disposed within the whistlehead retaining body 320 is a resilient diaphragm 300. In some embodiments of the disclosure, the resilient diaphragm 300 comprises a resilient material, such as a silicone material, a natural rubber, synthetic polyisoprene, and/or any suitable thermoplastic elastomer or vulcanizate. The resilient diaphragm 300 is held on a control spindle 304 by a diaphragm sealing washer 296 and a circular clip 294. The control spindle 304 comprises a tip 313, a head 306 and a flange head 308, which mates against the resilient diaphragm 300. The control spindle 304, the tip 313, and the diaphragm 300 have holes therethrough. A spring 310 rests against the flange head 308 of the control spindle 304, biasing the control spindle 304 against the resilient diaphragm 300, wherein the diaphragm 300 rests against a shoulder (not shown) within the whistlehead retaining body 320. Air flow changes causing pressure differences within the low-flow valve alarm 200 act on the resilient diaphragm 300, in turn causing the control spindle 304 to move. Also, a perspective view 290b of the diaphragm sealing collar 290 is shown. The perspective view 290b shows an internal boss 321 having air passages 319. In low air pressure conditions, the control spindle 304 may retreat toward the internal boss 321. Under these conditions, a front surface 311 of the control spindle 304 may butt up against a top surface 317 of the internal boss 321. However, air can still reach the resilient diaphragm 300 via the air passages 319.

The whistlehead retaining body 320 comprises a distal end 328 having internal threads for joining the whistlehead 330 thereto. The whistlehead 330 comprises a bore 339 for receiving a whistle plug 334 that mates inside a chamber 336 of the whistlehead 330 (a perspective view is shown as 330a), which, in turn, is placed inside a whistlehead locking tube 350. A sealing plug 332, comprising an elastomeric material, fits into the whistle plug 334 (a perspective view 334a, having the sealing plug 332, is shown). The whistle plug 334 further comprises a flat surface 335 and a key 333. The key 333 ensure that the flat surface 335 correlates with an air window 338. The air window 338 of the whistlehead 330, from which air passes, creates an audible alarm. The whistlehead locking tube 350 is joined optionally by a press-fit onto the distal end 328 of the whistlehead retaining body 320. In some exemplary embodiments of the disclosure, the whistlehead locking tube 350 has internal threads so that it can be screwed on external threads on the whistlehead 330.

Under conditions of high air flow/high pressure, the tip 313 of the control spindle 304 rest against the sealing plug 332, preventing or significantly limiting air flow from reaching the whistlehead 330. However, under conditions of low air flow/low pressure, the spring 310 biases the tip 313 away from the sealing plug 332, allowing air flow to occur. A low flow or air pressure results in low pressure across the diaphragm 300, which allows the spring 310 to open the air flow to the whistle head 330. The air flow can then reach the whistlehead 330, sounding an audible alarm. Furthermore, because the whistlehead 330 may comprise external threads, it can be screwed more tightly so that the sealing plug 332 is biased with more or less pressure against the tip 313, creating a low-flow valve alarm 200 having a spectrum of variable airflows/pressures. If no alarm is desired, a threaded plug (not shown) can replace the low flow valve assembly. A pressurized air source, e.g., an air cylinder, or air-line, is connected to a coupling (not shown) that is connected with the air inlet port 225, the air travels through the center bore 221 of the spindle handwheel 210, through the filter disc 260, and into the control valve body 270. The air flows into the bore 301 of the diaphragm sealing collar 290 and through the control spindle 304. Depending on the level of the air flow/air pressure, air can bias the tip 313 away from whistle plug 334, allowing air to travel into the whistlehead 330 and out the air window 338, where it can sound an audible alarm.

The alarm sounds because as the air flow drops, the pressure across the diaphragm 300 changes. The spring 310 biases the diaphragm 300 and the spindle handwheel 210 away from the seal, allowing air to flow through the whistlehead 330. For different flows (pressure) the whistlehead 330 is adjusted in or out so that the spindle handwheel 210 opens against the seal at a minimal flow rate. If the air flow is increased slightly, the alarm closes. This design allows the alarm to operate as the pressure drops (low flow) and stops if the pressure increases during operation. Furthermore, the resiliency of the resilient diaphragm 300 can be changed, e.g., a thinner resilient diaphragm 300 may be employed. Similarly, the resiliency of the resilient diaphragm 300 can be changed by employing a stiffer or more compliant elastomeric material. Also, the spring 310 can be interchanged easily with a stiffer or more compliant spring, which provides a different level of air flow pressures. Further still, different spindle handwheels 210, for example, a spindle handwheel 210 having a different depth and/or width of the air cavity 213 and/or a diameter of the hole 205 may be employed to change the operating pressures of the low-flow valve alarm. Accordingly, the spindle handwheel 210 acts as a continuous flow valve. With the foregoing in view, the low-flow valve alarm 200 having a variable pressure pre-set threshold, for use with protective suits and hoods is disclosed. As can be understood, the low-flow valve alarm 200 is a mechanical device comprising polymeric components. Accordingly, having no electronic or electric components or any components capable of creating sparks, embodiments of the low-flow valve alarm 200 are incapable of igniting flammable gases and liquids.

It is to be understood that the components of embodiments of the low flow valve alarm may comprise plastics, metals, sintered metals and/or ceramics having binders, and the like, as is known to those in the art. Any low flow valve alarm may comprise metals or plastic components or combinations thereof. Any component made of plastics, for example, may comprise polyethylene, polypropylene, nylons, polyesters, polyethylene terephthalate (PET), polybutylene terephthalate (PBT), vinyls, and poly acrylonitrile-butadiene-styrene (ABS), and/or the like. It is to be understood that the components of embodiments of the low flow valve alarm may be manufactured using injection molding techniques. It is to be understood that the components of embodiments of the low flow valve alarm may be manufactured using 3D printing technologies. It is to be understood that the components of embodiments of the low flow valve alarm may be manufactured as sub-components. For example, but not limited to, a whistlehead retaining body may be molded with a whistlehead, forming a single whistlehead retaining body/whistlehead component.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

The foregoing description of embodiments of the disclosure comprises a number of elements, devices, machines, components and/or assemblies that perform various functions as described. These elements, devices, machines, components and/or assemblies are exemplary implementations of means for performing their respectively described functions.

Although only a few exemplary embodiments of the present disclosure have been described in detail above, those skilled in the art will readily appreciate that many modifications are possible in the exemplary embodiments without materially departing from the novel teachings and advantages of this disclosure.

The invention claimed is:

1. A low-flow valve alarm, comprising:
   an adjustable spindle handwheel having a hole;
   a valve body having an air inlet port, the valve body connected with the adjustable spindle handwheel;
   a hollow handwheel body joined to the adjustable spindle handwheel;
   a diaphragm sealing collar joined to a whistlehead retaining body, the whistlehead retaining body having a central bore and joined with a whistlehead;
   a resilient diaphragm joined with a control spindle disposed within the central bore of the whistlehead retaining body, the control spindle having an air channel, wherein air can travel through the air channel; and
   wherein air flow is adapted to act on the resilient diaphragm, compressing the a spring and wherein a low air pressure condition relaxes compression on the spring, producing an audible alarm.

2. The low-flow valve alarm of claim 1, wherein an operating range of the low-flow valve alarm is approximately 2-10 bar of pressure.

3. The low-flow valve alarm of claim 1, wherein a position of the whistlehead is adjustable.

4. The low-flow valve alarm of claim 1, wherein the air flow is adjustable via the adjustable spindle handwheel.

5. The low-flow valve alarm of claim 1 comprising a sealing plug disposed within a whistle plug that is disposed within a bore of the whistlehead.

6. The low-flow valve alarm of claim 5, wherein the position of the sealing plug is adjustable by adjusting the position of the whistlehead.

7. The low-flow valve alarm of claim 1, further comprising a filter disposed within the valve body.

8. The low-flow valve alarm of claim 7, wherein the filter is a replaceable filter disc.

9. The low-flow valve alarm of cclaim 1, wherein the whistlehead retaining body comprises internal threads so that its position relative to diaphragm sealing collar is adjustable.

10. The low-flow valve alarm of claim 1, wherein the hollow handwheel body comprises an exhaust port.

11. The low-flow valve alarm of claim 1, wherein the spindle handwheel further comprises a channel and a hole that permits air to flow therethrough.

12. The low-flow valve alarm of claim 1, wherein the spindle handwheel rotates approximately 150° for adjusting airflow.

13. The low-flow valve alarm of claim 1, wherein the handwheel body is adapted to join with differently sized spindle handwheels.

14. The low-flow valve alarm of claim 1, wherein the hole of the handwheel body comprises a diameter of 2.2 to 5.5 mm.

15. The low-flow valve alarm of claim 1, wherein the hole of the handwheel body is disposed within an air cavity ranging from 4.0 to 6.0 mm in width and 0.15 mm to 2.4 mm in depth.

16. A low-flow valve alarm, comprising:
    an adjustable spindle handwheel having a hole;
    a valve body having an air inlet port, the valve body connected with the adjustable spindle handwheel;
    a hollow handwheel body joined to the adjustable spindle handwheel;
    a diaphragm sealing collar joined to a whistlehead retaining body, the whistlehead retaining body having a central bore and joined with a whistlehead; and
    a resilient diaphragm joined with a control spindle disposed within the central bore of the whistlehead retaining body, the control spindle having a tip and an air channel, wherein air can travel through the air channel; and
    a sealing plug disposed within a whistle plug that is disposed within a bore of the whistlehead, wherein the tip is configured to rest against the sealing plug or be positioned away from the sealing plug.

17. The low-flow valve alarm of claim 16, wherein an operating range of the low-flow valve alarm is approximately 2-10 bar of pressure.

18. The low-flow valve alarm of claim 16, wherein the position of the whistlehead is adjustable.

19. The low-flow valve alarm of claim 16, wherein air flow within the air channel is adjustable via the adjustable spindle handwheel.

20. The low-flow valve alarm of claim 16, wherein the spindle handwheel further comprises a channel and a hole that permits air to flow therethrough.

* * * * *